US011987143B2

(12) United States Patent
Labell et al.

(10) Patent No.: US 11,987,143 B2
(45) Date of Patent: *May 21, 2024

(54) CHARGING SYSTEM FOR A VEHICLE AND AUTOMATED PARKING SYSTEM

(71) Applicant: Westfalia Technologies, Inc., York, PA (US)

(72) Inventors: Daniel Labell, Mechanicsburg, PA (US); David Matthew Weder, Smoketown, PA (US); Ian Todd, Mount Pleasant, SC (US)

(73) Assignee: Westfalia Technologies, Inc., York, PA (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/999,655

(22) Filed: Aug. 21, 2020

(65) Prior Publication Data

US 2022/0055495 A1 Feb. 24, 2022

(51) Int. Cl.
*B60L 53/37* (2019.01)
*B60L 53/18* (2019.01)
*B60L 53/66* (2019.01)
*B60L 53/68* (2019.01)
*B60W 30/06* (2006.01)
*B62D 15/02* (2006.01)
*E04H 6/42* (2006.01)

(52) U.S. Cl.
CPC ............. *B60L 53/37* (2019.02); *B60L 53/18* (2019.02); *B60L 53/68* (2019.02); *B60W 30/06* (2013.01); *B62D 15/0285* (2013.01); *E04H 6/42* (2013.01); *B60L 53/665* (2019.02); *B60L 2250/14* (2013.01)

(58) Field of Classification Search
CPC ........ B60L 53/37; B60L 53/18; B60L 53/665; B60L 53/36; B60L 2250/14; E04H 6/42
See application file for complete search history.

(56) References Cited

U.S. PATENT DOCUMENTS

| 5,323,099 | A | 6/1994 | Bruni et al. | |
|---|---|---|---|---|
| 7,999,506 | B1 | 8/2011 | Hollar et al. | |
| 10,052,962 | B2 | 8/2018 | Dunger et al. | |
| 2011/0074351 | A1 | 3/2011 | Bianco et al. | |
| 2013/0088194 | A1 | 4/2013 | Hunter et al. | |
| 2014/0035527 | A1* | 2/2014 | Hayashigawa | ........... B60L 3/04 320/109 |
| 2014/0266004 | A1* | 9/2014 | Andrews, Jr. | ........... B60L 53/36 320/108 |

(Continued)

FOREIGN PATENT DOCUMENTS

| CN | 106004500 A | 10/2016 |
|---|---|---|
| CN | 107264318 A | 10/2017 |

(Continued)

OTHER PUBLICATIONS

Machine translation of JP-2011117155-A. (Year: 2022).*

(Continued)

*Primary Examiner* — David V Henze-Gongola
(74) *Attorney, Agent, or Firm* — Barley Snyder

(57) ABSTRACT

A charging system for a vehicle includes a connector suspended on a flexible cable and an adapter having a plug at a first end and an adapter port at a second end opposite the first end. The plug is removably disposed in a charging port of the vehicle and the adapter port extends outward from the vehicle. The connector is movable along a plurality of axes perpendicular to one another into a mated position with the adapter port.

29 Claims, 12 Drawing Sheets

(56) References Cited

U.S. PATENT DOCUMENTS

| | | |
|---|---|---|
| 2017/0136893 A1 | 5/2017 | Ricci |
| 2018/0062330 A1 | 3/2018 | Roberts |
| 2019/0061542 A1 | 2/2019 | Zhao et al. |
| 2019/0232811 A1 | 8/2019 | Wastel |
| 2019/0315240 A1 | 10/2019 | Wu |
| 2019/0340782 A1 | 11/2019 | Sinha et al. |
| 2020/0031248 A1 | 1/2020 | Kwak et al. |
| 2020/0207233 A1* | 7/2020 | Sato ................... B60L 58/18 |
| 2021/0001740 A1* | 1/2021 | Machida ............. B60L 53/37 |
| 2022/0055491 A1* | 2/2022 | Labell ................ H01R 13/629 |

FOREIGN PATENT DOCUMENTS

| | | | |
|---|---|---|---|
| CN | 108437826 B | | 3/2020 |
| JP | 2011117155 A | * | 6/2011 |
| JP | 2011117155 A | | 6/2011 |
| KR | 101792792 B1 | | 11/2017 |
| KR | 11895550 B1 | | 10/2018 |
| KR | 102022781 B1 | | 9/2019 |
| WO | 2013041133 A1 | | 3/2013 |
| WO | 2017109594 A1 | | 6/2017 |

OTHER PUBLICATIONS

Abstract of KR 102022781, dated Sep. 18, 2019, 1 page.
Abstract of KR 101792792, dated Nov. 2, 2017, 1 page.
Abstract of CN 106004500, dated Oct. 12, 2016, 1 page.
Abstract of CN 107264319, dated Oct. 20, 2017, 2 pages.
PCT Notification, The International Search Report and The Written Opinion, Intl App No. PCT/US2021/046950, dated Nov. 4, 2021, 13 pages.

* cited by examiner

US 11,987,143 B2

CHARGING SYSTEM FOR A VEHICLE AND AUTOMATED PARKING SYSTEM

FIELD OF THE INVENTION

The present invention relates to a charging system and, more particularly, to a charging system for a vehicle.

BACKGROUND

Charging a battery of an electric or plug-in hybrid vehicle most commonly requires a user to find a charging station and manually insert a charging plug into the charging port of the vehicle. Due to issues including capacity, availability, and inefficiency of timing for multiple vehicles requiring various levels of charge, some automated charging systems have been developed that charge vehicles in certain charging locations. These systems, however, still require significant human intervention for the charging, require expensive configurations that are not adaptable to available vehicles, and/or fail to adapt to different plugging standards for different vehicles.

SUMMARY

A charging system for a vehicle includes a connector suspended on a flexible cable and an adapter having a plug at a first end and an adapter port at a second end opposite the first end. The plug is removably disposed in a charging port of the vehicle and the adapter port extends outward from the vehicle. The connector is movable along a plurality of axes perpendicular to one another into a mated position with the adapter port.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
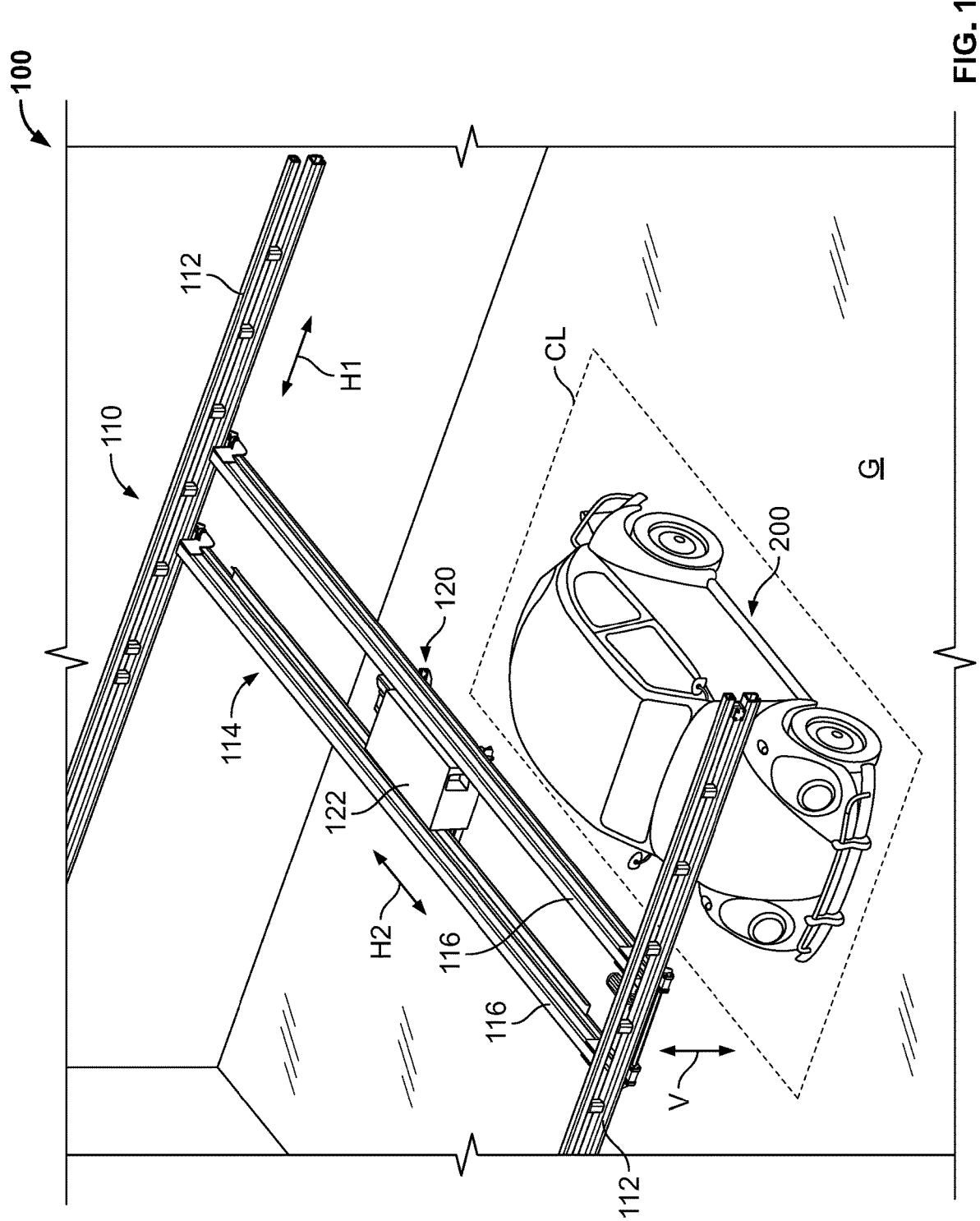
FIG. 1 is a perspective view of a charging system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

A charging system 100 according to an embodiment for a vehicle 200 is shown in FIGS. 1-6. The charging system 100 includes an overhead moving system 110, a connector 140 attached to and movable with the overhead moving system 110, an adapter 150 pluggable into the vehicle 200 and matable with the connector 140, a vision system 160, and a charging controller 170 connected to the vision system 160 and controlling movement of the overhead moving system 110.

Figure 2:
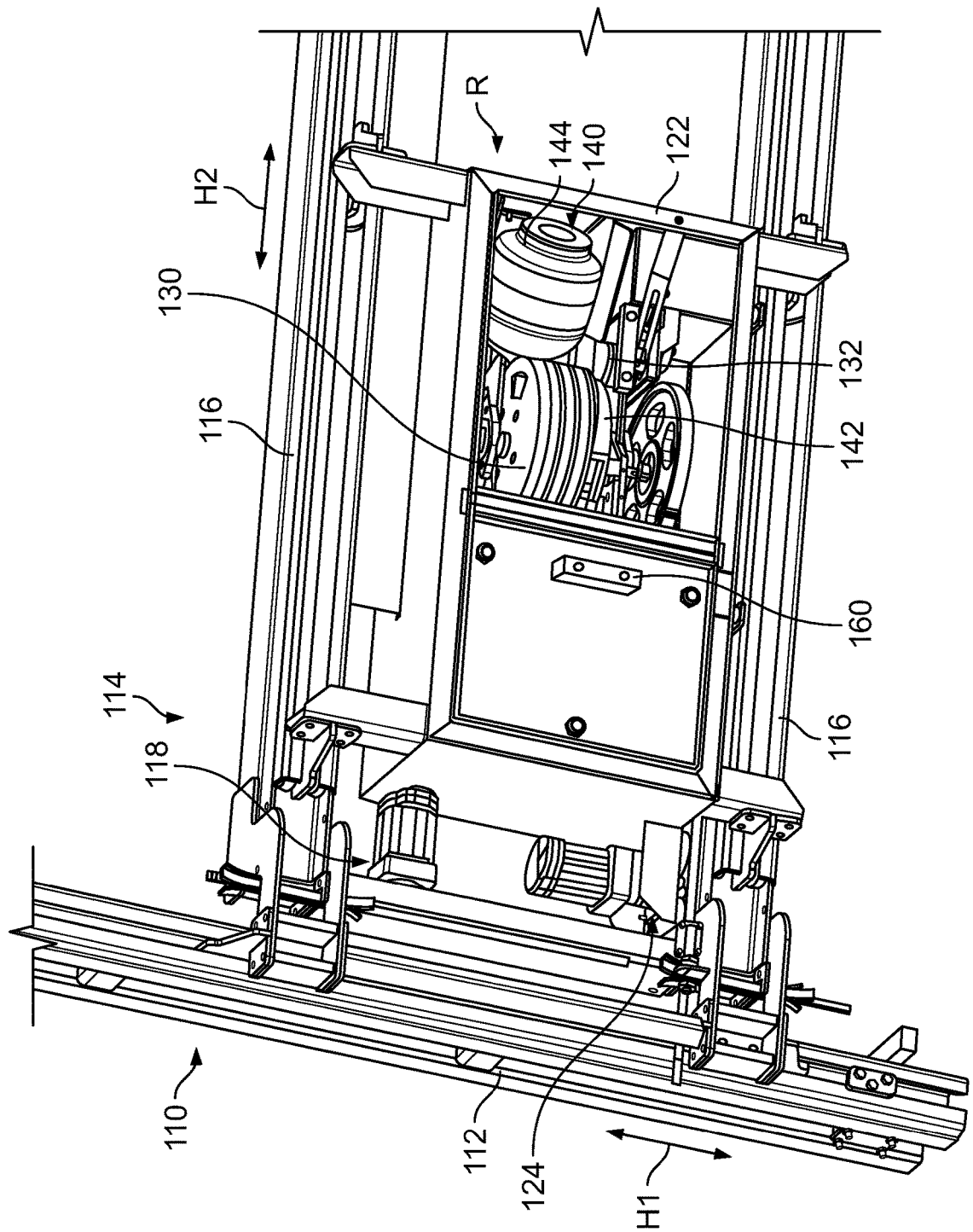
FIG. 2 is a perspective view of an overhead moving system of the charging system.

The overhead moving system 110, as shown in FIGS. 1 and 2, includes a pair of support rails 112, a bridge 114 movable along the pair of support rails 112, a trolley 120 movable along the bridge 114, and a cable reel 130 disposed in the trolley 120. In an embodiment, the overhead moving system 110 is a gantry.

The pair of support rails 112, as shown in FIG. 1, extend parallel to one another and are spaced apart from one another. The support rails 112 have a fixed position along a plurality of axes that include a first horizontal axis H1, a second horizontal axis H2 perpendicular to the first horizontal axis H1, and a vertical axis V perpendicular to the first horizontal axis H1 and the second horizontal axis H2. In the shown embodiment, the support rails 112 each extend along the first horizontal axis H1 and are spaced apart from one another along the second horizontal axis H2. The support rails 112 are positioned in the vertical axis V over at least one charging storage location CL on a ground surface G in which a vehicle 200 is parked. The support rails 112 may be fixed to a ceiling, extend between walls, may be supported from the ground surface G, or may have any other type of securing that fixes the support rails 112 in position over at least one charging storage location CL.

The bridge 114, as shown in FIGS. 1 and 2, has a pair of bridge rails 116 attached at opposite ends to the support rails 112. The bridge rails 116 extend along the second horizontal axis H2 and are spaced apart from one another along the first horizontal axis H1. The bridge 114, at each of the opposite ends of the bridge rails 116, has a bridge drive 118 connected to the bridge rails 116, as shown in FIG. 2. The bridge drive 118 engages the support rails 112 and is drivable to move the bridge 114 along the first horizontal axis H1 along the support rails 112. The bridge drive 118 may include a motor driving a timing belt, a motor driving a plurality of wheels, or any other element capable of providing a controllable driving force to move the bridge 114 along the first horizontal axis H1.

The trolley 120, as shown in FIGS. 1 and 2, has a trolley housing 122 disposed between the bridge rails 116, held by the bridge 114, and a trolley drive 124 connected to the trolley housing 122. The trolley drive 124 is drivable to move the trolley housing 122 along the second horizontal axis H2 along the bridge rails 116. The trolley drive 124 may include a motor driving a timing belt, a motor driving a plurality of wheels, or any other element capable of providing a controllable driving force to move the trolley housing 122 along the second horizontal axis H2.

The cable reel 130, as shown in FIG. 2, is disposed in the trolley housing 122. The cable reel 130 is rotatable within the trolley housing 122 by a reel drive 132 attached to the cable reel 130. The reel drive 132 can be any element capable of rotating the cable reel 130 within the trolley housing 122.

Figure 3:
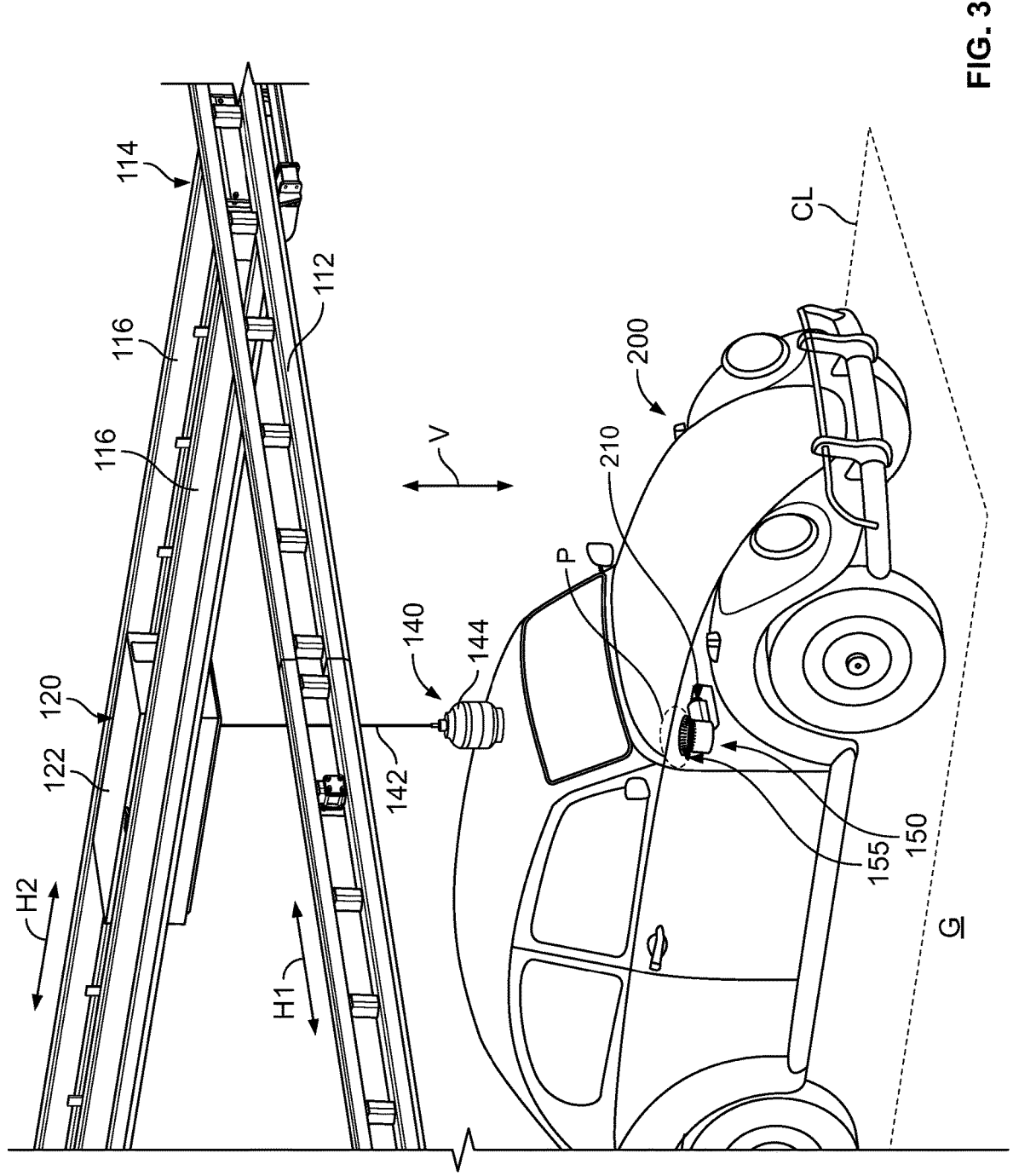
FIG. 3 is a perspective view of the charging system with an adapter inserted into a charging port of a vehicle.
Figure 4:
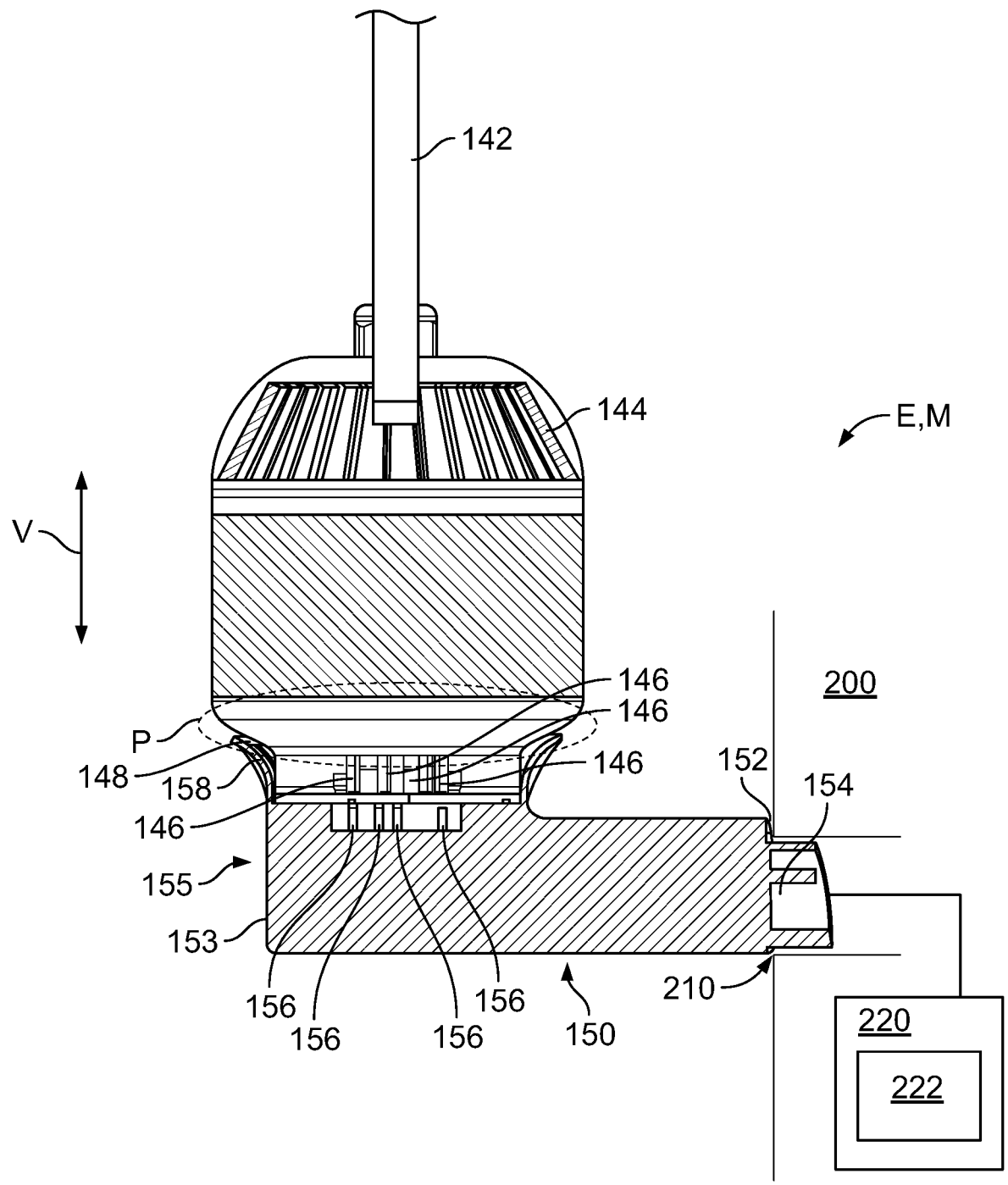
FIG. 4 is a sectional side view of a connector of the charging system in a mated position with the adapter.

The connector 140, as shown in FIGS. 2-4, includes a connector housing 144 attached to an end of a flexible cable 142. In the shown embodiment, the flexible cable 142 is capable of conducting various ranges of AC or DC voltages that can be used to charge a vehicle 200. In other embodiments, the flexible cable 142 may be any type of flexible electrical cable usable in any vehicle charging application. The flexible cable 142, as shown in FIG. 2, is wound around the cable reel 130 and attached to the trolley 120 at the cable reel 130. The connector 140 is suspended on the flexible cable 142 from the cable reel 130.

In the connector housing 144, as shown in FIG. 4, the connector 140 has a plurality of first contacts 146 electrically connected to the flexible cable 142 and a first alignment element 148. In the shown embodiment, the first alignment element 148 is an outer profile of the connector housing 144. In other embodiments, the first alignment element 148 could be a magnet disposed within the connector housing 144, or could be any element or any combination of elements that contributes to positioning the connector 140 in a mating alignment orientation as described in greater detail below.

The adapter 150, as shown in FIGS. 3 and 4, has a first end 152 with a plug 154 and a second end 153 opposite the first end 152 with an adapter port 155. The plug 154 meets one of a plurality of connector standards for charging vehicles, for example, SAE J1772 or IEC 62196. The plug 154, however, can be any type of connector that meets any known standard in charging vehicles or is otherwise usable in charging vehicles.

The adapter port 155, as shown in FIG. 4, has a plurality of second contacts 156 electrically connected to the plug 154 and a second alignment element 158. In the shown embodiment, the second alignment element 158 is a profile of the adapter port 155. In other embodiments, the second alignment element 158 could be a magnet disposed within the adapter port 155, or could be any element or any combination of elements that contributed to positioning the connector 140 in the mating alignment orientation in the adapter port 155 as described in greater detail below.

The vision system 160, as shown in FIGS. 1 and 2, is disposed on the trolley housing 122 and faces toward the ground surface G and the charging storage location CL. The vision system 160 can be any type of imaging device, for example a camera, that is capable of outputting vision data for processing that is sufficiently detailed to permit identification of discrete elements in the field of vision of the vision system 160.

Figure 5:
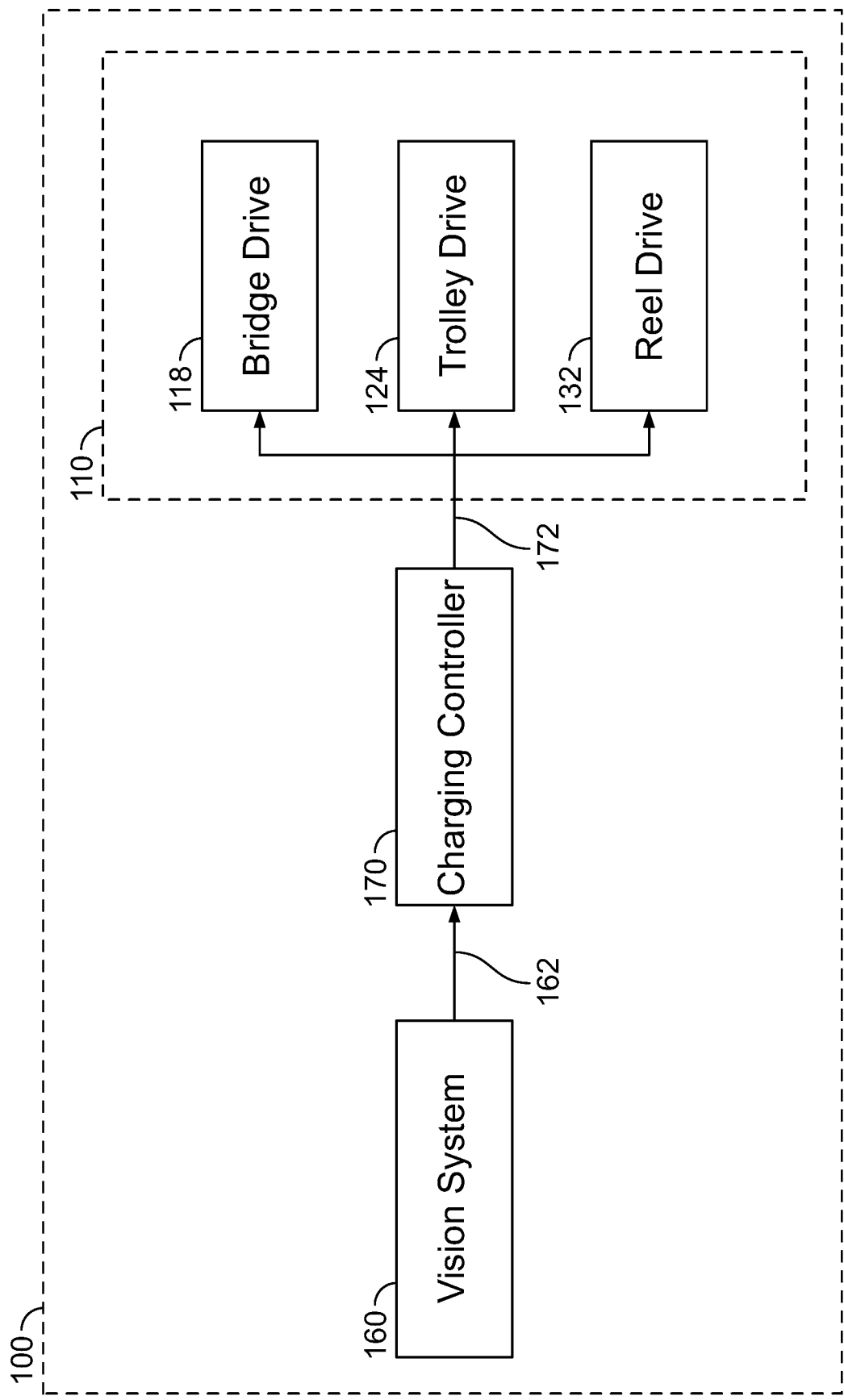
FIG. 5 is a block diagram of connections of a charging controller of the charging system.

The charging controller 170, as shown in FIG. 5, is connected to the vision system 160 and the overhead moving system 110. The charging controller 170 includes a processor and a plurality of instructions stored on a non-transitory computer readable medium that, when executed by the processor, performs the functions of the charging controller 170 described herein. In an embodiment, the charging controller 170 is disposed in the trolley housing 122. In other embodiments, the charging controller 170 can be disposed anywhere in the charging system 100, including remotely, provided the charging controller 170 is capable of controlling the elements of the charging system 100 as described in detail below.

A charging process 600 of automatically charging the vehicle 200 parked in the charging storage location CL with the charging system 100 will now be described in greater detail primarily with reference to FIG. 6.

The vehicle 200, as shown in FIGS. 3 and 4, includes a charging port 210 and a battery 220 connected to the charging port 210. The charging port 210 may be adapted to any known standard in charging vehicles or may be any port that is otherwise usable in charging vehicles. The charging port 210 is electrically connected to the battery 220. In an embodiment, the battery 220 provides a motive power to the vehicle 200. The vehicle 200 may be a plug-in hybrid, a fully electric vehicle, or any other type of vehicle that has a charging port 210 for charging a battery 220. The battery 220 has a charge level 222 indicating a current capacity of the battery 220.

Figure 6:
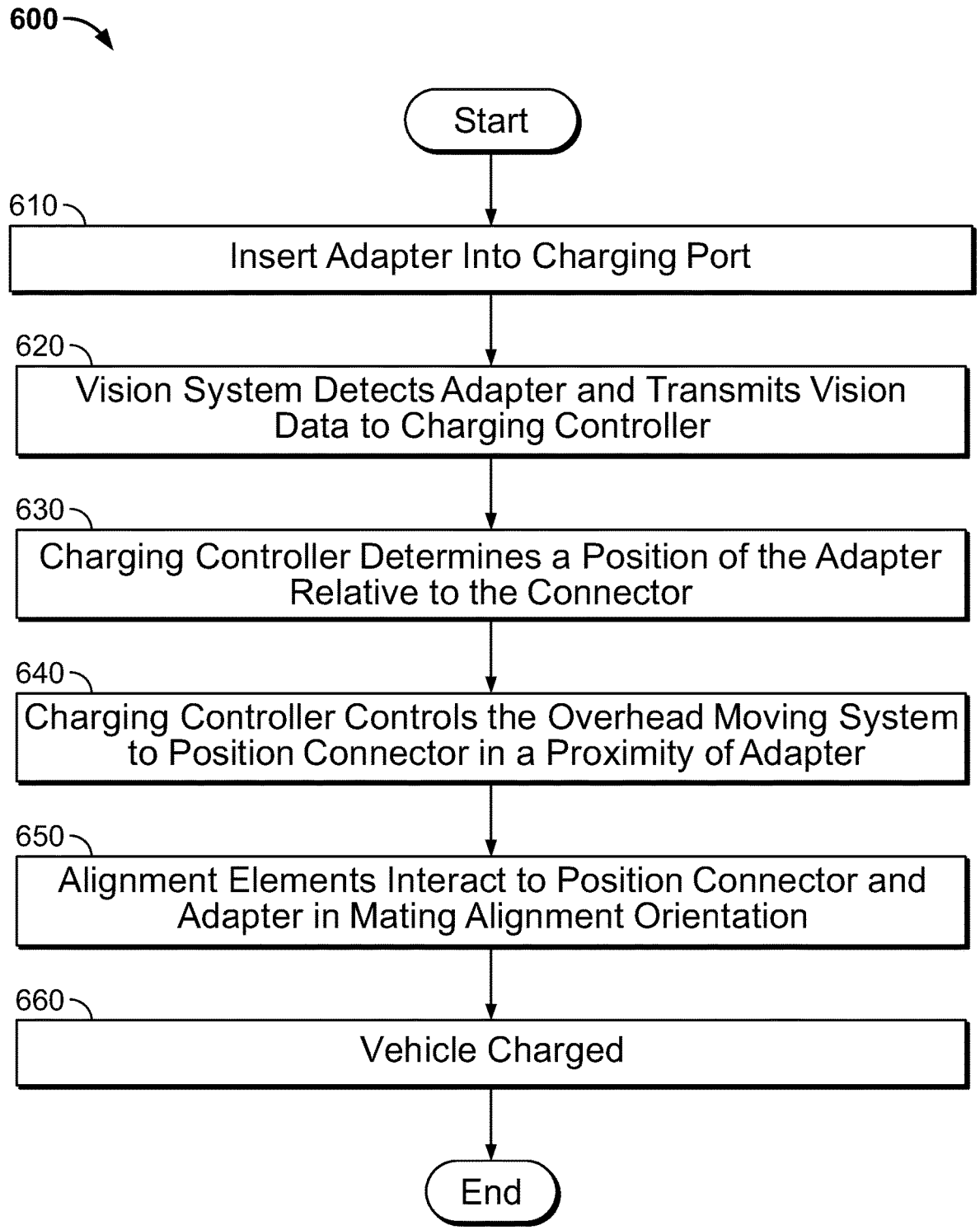
FIG. 6 is a flowchart of a charging process of automatically charging the vehicle with the charging system.

In a first step 610 shown in FIG. 6, the adapter 150 is inserted into the charging port 210 as shown in FIGS. 3 and 4. The plug 154 is removably disposed in the charging port 210 and the adapter port 155 extends outward from the vehicle 200. The plug 154 mates with the charging port 210 and electrically connects with the charging port 210. The adapter 150 may be inserted into the charging port 210 prior to moving the vehicle 200 into the charging storage location CL, as described in greater detail in an embodiment below, or may be inserted into the charging port 210 after the vehicle 200 is moved to the charging storage location CL.

In a step 620, shown in FIG. 6, the vision system 160 detects the adapter 150 positioned in the charging port 210. The adapter 150 is in a field of view of the vision system 160 that faces the ground surface G and the charging storage location CL, as shown in FIGS. 2 and 3. The vision system 160, as shown in FIG. 5, transmits a vision data 162 to the charging controller 170 representative of the field of view including the adapter 150. The vision data 162 may be an image or any other type of data representative of the field of view of the vision system 160.

The charging controller 170, in a step 630 shown in FIG. 6, receives the vision data 162 from the vision system 160. The charging controller 170, by execution of the processor, locates the adapter 150 within the vision data 162 and determines a position of the adapter 150 relative to the connector 140 along the first horizontal axis H1, the second horizontal axis H2, and the vertical axis V.

Based on the location of the adapter 150 with respect to the connector 140, in a step 640 shown in FIG. 6, the charging controller 170 transmits a plurality of drive control signals 172 to the overhead moving system 110 as shown in FIG. 5. The drive control signals 172 control the bridge drive 118 to move the bridge 114 and position the connector 140 along the first horizontal axis H1, control the trolley drive 124 to move the trolley 120 and position the connector 140 along the second horizontal axis H2, and control the reel drive 132 to rotate the cable reel 130. The connector 140 is movable with respect to the trolley 120 along the vertical axis V by rotation of the cable reel 130. The cable reel 130 is rotatable to wind or unwind the flexible cable 142 and move the connector 140 between a retracted position R distal from the vehicle 200, shown in FIG. 2, and an extended position E proximal to the vehicle 200 along the vertical axis V, shown in FIG. 4. In a retracted position R shown in FIG. 2, the flexible cable 142 is fully wound around the cable reel 130 and the connector housing 144 is disposed within the trolley housing 122. The connector 140 is movable along the plurality of axes H1, H2, V by the overhead moving system 110.

The drive control signals 172 control the bridge drive 118, the trolley drive 124, and the reel drive 132 to position the connector 140 in a proximity P of the adapter port 155, as shown in FIGS. 3 and 4. In some embodiments, the overhead moving system 110 may not be able to positon the connector 140 in a mated position in the adapter port 155, but may only be able to position the connector 140 within the proximity P of the adapter port 155.

In these embodiments, in a step 650 shown in FIG. 6, the first alignment element 148 of the connector 140 interacts with the second alignment element 158 of the adapter port 155 to position the connector 140 in a mating alignment orientation with respect to the adapter port 155 from the proximity P. In the embodiment shown in FIG. 4, for example, the outer profile of the connector housing 144 serving as the first alignment element 148 abuts the profile of the adapter port 155 serving as the second alignment element 158 to properly position the connector 140 with respect to the adapter port 155 in the mating alignment orientation, allowing further movement of the connector 140 in the vertical axis V to a mated position with the adapter port 155. In an embodiment, the first alignment element 148 and the second alignment element 158 position the connector 140 along the first horizontal axis H1, the second horizontal axis H2, and the vertical axis V from the proximity P to the mating alignment orientation. In other embodiments, for example if the alignment elements 148, 158 are magnets, the alignment elements 148, 158 may also properly position the connector 140 in a rotational orientation about the vertical axis V as part of the mating alignment orientation.

In other embodiments, the overhead moving system 110 can move the connector 140 into the mated position in the adapter port 155 in the mating alignment orientation without the use of the first alignment element 148 and the second alignment element 158.

In all embodiments, the movement of the overhead system 110 controlled by the charging controller 170 in steps 640 and 650 automatically positions the connector 140 in the mating alignment orientation and the mated position in the adapter port 155, as shown in FIG. 4. In the mated position, the first contacts 146 are electrically connected with the second contacts 156. In a step 660 shown in FIG. 6, the flexible cable 142 conducts an electrical supply that passes through the connected contacts 146, 156, through the plug 154, and to the battery 220 of the vehicle 200 to charge the battery 220.

In an embodiment, a user could drive their vehicle 200 to the charging storage location CL, park the vehicle 200, and insert the adapter 150 into the charging port 210 to being the charging process 600 shown in FIG. 6. In another embodiment, the vehicle 200 could be moved to a charging storage location CL as part of an automated parking system 10.

Figure 7:
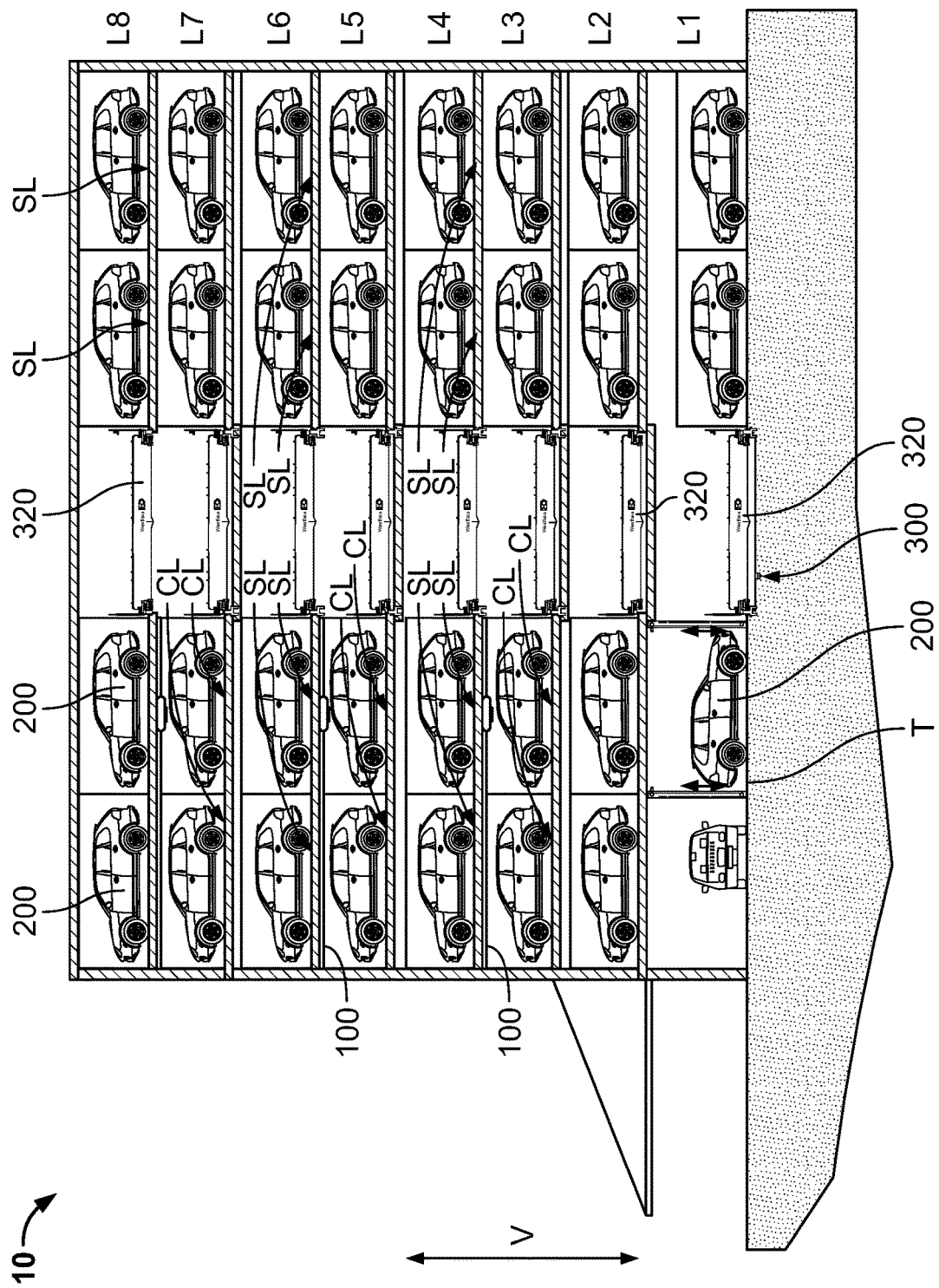
FIG. 7 is a sectional side view of an automated parking system according to an embodiment.
Figure 8:
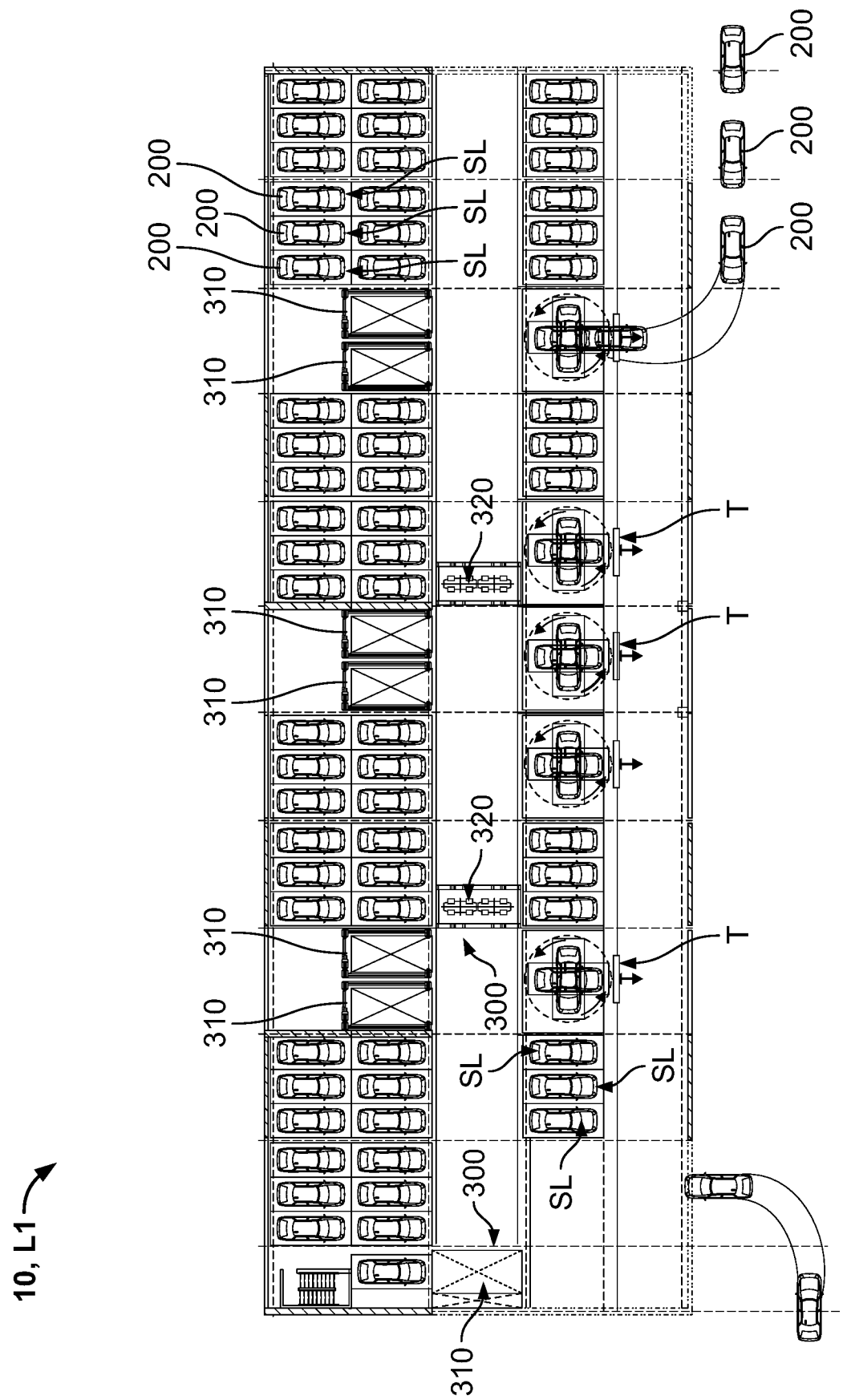
FIG. 8 is a top view of a first level of the automated parking system.
Figure 9:
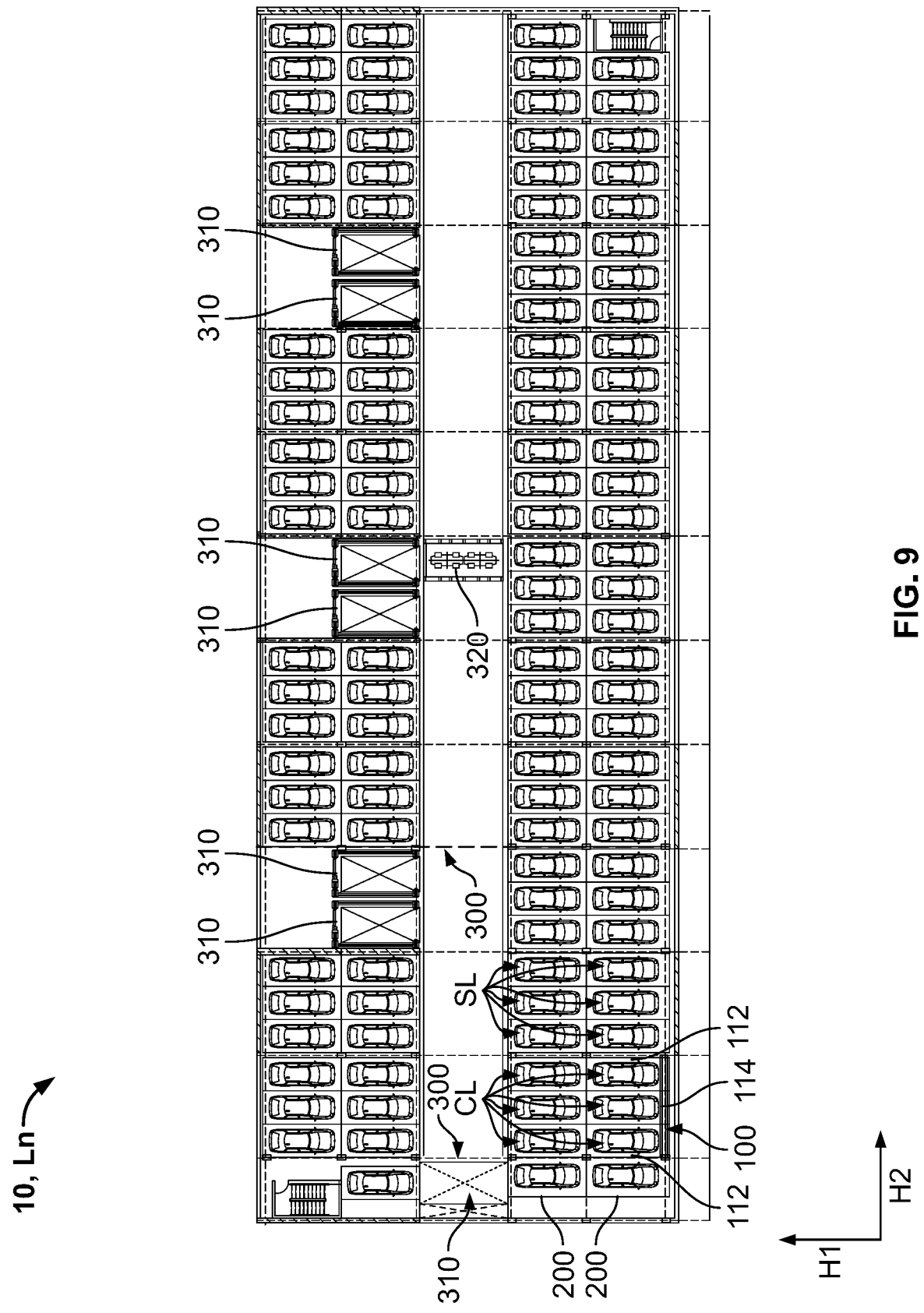
FIG. 9 is a top view of another level of the automated parking system.

An automated parking system (APS) 10 according to an embodiment is shown in FIGS. 7-9. The automated parking system 10 includes a transfer area T in which a user leaves a vehicle 200 and a plurality of levels L1, L2, L3 ... Ln. In the embodiment shown in FIG. 7, the automated parking system 10 has eight levels L1-L8, however, in other embodiments, the APS 10 may have any number of levels including only one level L1. In FIGS. 7-9, only some of a plurality of like elements are labeled with reference numbers for clarity of the drawings. However, elements that appear identically in the drawings have identical components and functions to those labeled and described herein.

Each of the levels L1-Ln, as shown in FIGS. 7-9, has a plurality of standard storage locations SL and/or a plurality of charging storage locations CL. In FIGS. 7-9, for clarity, all charging storage locations CL are labeled and any non-labeled storage locations containing a vehicle 200 are standard storage locations SL. In the embodiment shown in FIGS. 7-9, for example, the first level L1 has only standard storage locations SL and other levels L3, L5, L7, Ln have both charging storage locations CL and standard storage locations SL. The arrangement of charging storage locations CL and standard storage locations SL as shown in FIGS. 7-9 is merely an exemplary embodiment however, and any level L1-Ln could have any combination of charging storage locations CL and standard storage locations SL.

The APS 10 includes a vehicle relocation system 300, shown in FIGS. 7-9, that is capable of automatically moving the vehicles 200 between the transfer area T, the plurality of standard storage locations SL, and the plurality of charging storage locations CL. In the shown embodiment, the vehicle relocation system 300 is a lift and shuttle system that includes a plurality of lifts 310 moving the vehicles 200 between the various levels L1-Ln and a plurality of shuttles 320 moving the vehicles 200 between the lifts 310 and the storage locations SL, CL on each individual level L1-Ln. In other embodiments, the vehicle relocation system 300 could be a pallet-based conveyor system, a stacker crane system, or any other movement system used in an automated storage system that is capable of moving the vehicles 200 between the transfer area T, the plurality of standard storage locations SL, and the plurality of charging storage locations CL.

As shown in FIGS. 7 and 9, each of the charging storage locations CL is reachable by a charging system 100 as shown in FIGS. 1-4 and described in detail above. In an embodiment, one charging system 100 can serve a plurality of charging storage locations CL; the connector 140 attached to the overhead moving system 110 is movable by the overhead moving system 110 anywhere within the plurality of charging storage locations CL. In the embodiment shown in FIG. 9, one charging system 100 can reach six different charging storage locations CL each containing a different vehicle 200, with the connector 140 capable of mating with the adapter 150 connected to any of the plurality of different vehicles 200 in the plurality of different charging storage locations CL. The adapter ports 155 of the various adapters 150 are the same across the different vehicles 200 in the different charging storage locations CL, even if the plugs 154 of the adapters 150 are different for different charging ports 210. In other embodiments, each charging system 100 can serve any number of charging storage locations CL, including only one charging storage location CL.

In the embodiment shown in FIG. 9, only one charging system 100 is located on the level Ln. In other embodiments, multiple charging systems 100 each serving multiple charging storage locations CL may be located on the same level Ln. The standard storage locations SL are not reachable by a charging system 100.

Figure 10:
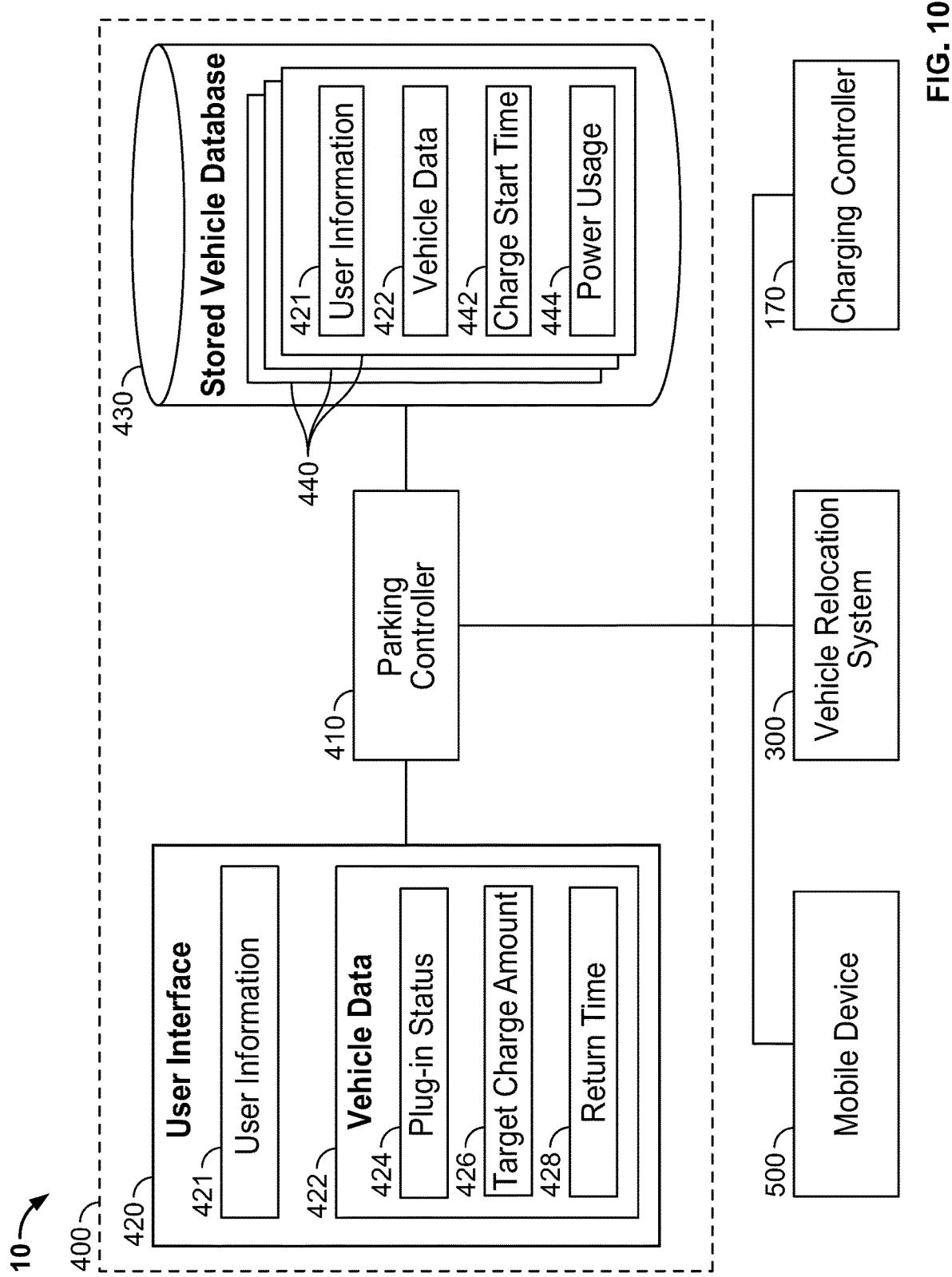
FIG. 10 is a block diagram of connections of a parking control system of the automated parking system.

The APS 10, as shown in FIG. 10, includes a parking control system 400 connected to the vehicle relocation system 300, the charging controller 170, and at least one mobile device 500.

The parking control system 400, as shown in FIG. 10, includes a parking controller 410, a user interface 420 connected to the parking controller 410, and a stored vehicle database 430 connected to the parking controller 410. The parking controller 410 includes a processor and a plurality of instructions stored on a non-transitory computer readable medium that, when executed by the processor, performs the functions of the parking controller 410 described herein. The user interface 420 may be a touch screen, a computing terminal, a computing kiosk, or any other type of standalone computing interface and, in an embodiment, is positioned just outside of the transfer area T. In this embodiment, each user interface 420 corresponds to one particular transfer area T of the APS 10. In other embodiments, the user interface 420 could be positioned anywhere within the APS 10 or in a proximity to the APS 10. In another embodiment, the user interface 420 may be part of the mobile device 500, and may be remote from the APS 10. The stored vehicle database 430 may be any type of computing database capable of storing and exchanging the data as described herein.

The mobile device 500, shown in FIG. 10, is associated with a user of one of the vehicles 200. The mobile device 500 may be a smart phone, a laptop, or any other type of mobile computing device associated with an individual and capable of exchanging the data as described herein.

A charging process 700 of automatically charging the vehicle 200 in the APS 10 will now be described in greater detail primarily with reference to FIGS. 11A and 11B. In the embodiments shown in FIGS. 7-11B and referenced in the charging process 700 below, only some of the vehicles 200 are capable of being plugged in to charge a battery 220.

Figure 11A:
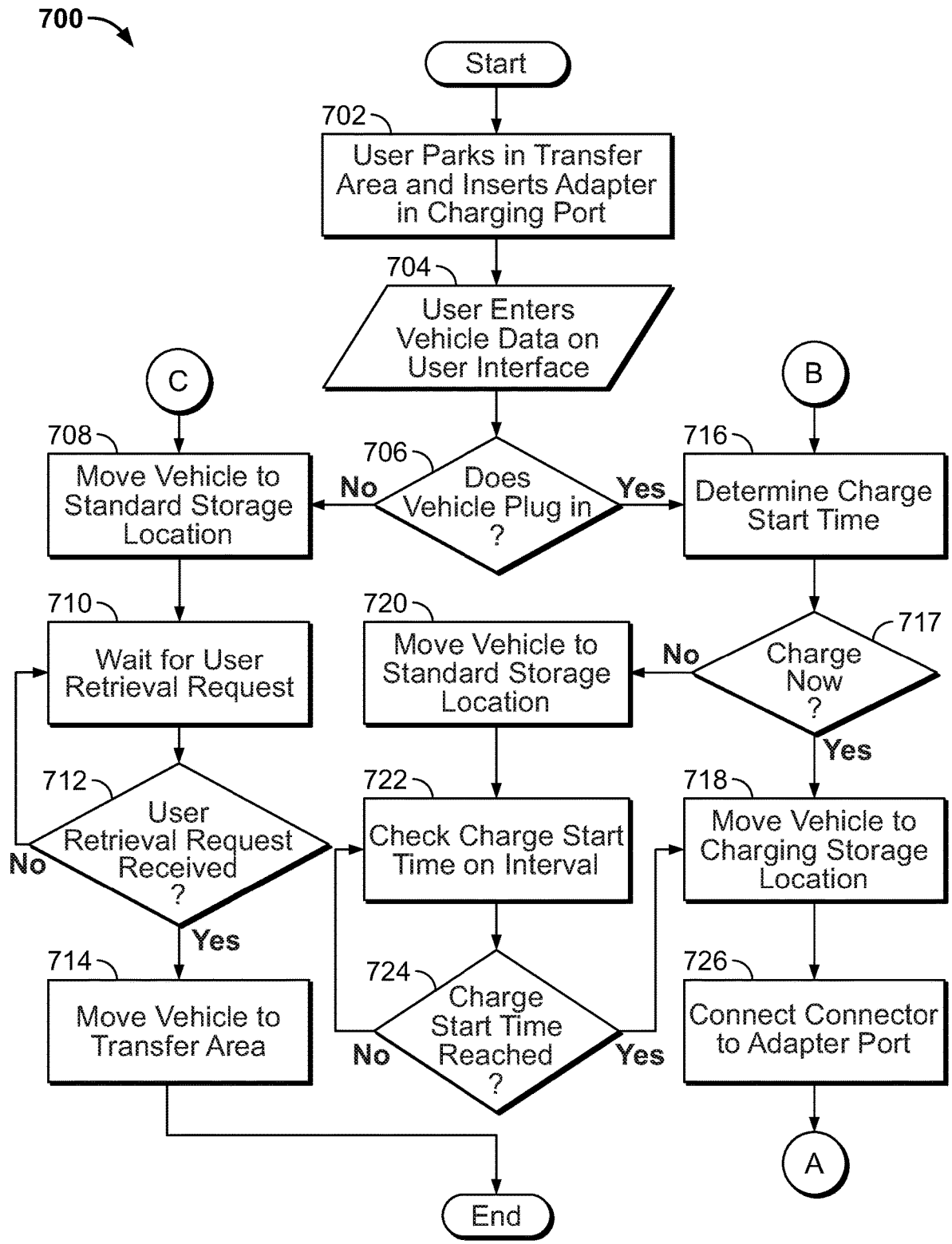
FIG. 11A is a flowchart of a charging process of automatically charging the vehicle in the automated parking system.

The charging process 700 starts, in a step 702 shown in FIG. 11A, with a user of a vehicle 200 driving the vehicle 200 into the transfer area T, as shown in FIGS. 7 and 8. If the vehicle 200 is a plug-in vehicle, the user has the adapter 150 for the vehicle 200 with the plug 154 of the adapter 150 corresponding to the charging port 210 of the vehicle 200. In an embodiment, the adapter 150 is associated with the vehicle 200 and travels with the vehicle 200, moving outside of the charging storage location CL having the charging system 100 and outside of the APS 10. The user inserts the plug 154 of the adapter 150 into the charging port 210, for example as shown in FIG. 3, while the vehicle 200 is positioned in the transfer area T.

In a step 704 shown in FIG. 11A, with the vehicle 200 positioned in the transfer area T and the adapter 150 positioned in the charging port 210, the user enters a user information 421 and a plurality of vehicle data 422 into the user interface 420, as shown in FIG. 10. The user information 421 is a user identification, such as the user's name or a user number, user contact information, such as a phone number, an email address, or any other combination or piece of information that would allow identification of a specific user and the mobile device 500 associated with the specific user. In another embodiment, in step 704, the user information 421 and vehicle data 422 can be automatically transmitted from the vehicle 200 to the parking controller 410.

The vehicle data 422 includes, as shown in FIG. 10, a plug-in status 424 of the vehicle 200, a target charge amount 426 of the vehicle 200, and a return time 428 for the vehicle 200. The plug-in status 424 indicates whether the vehicle 200 is capable of being plugged in to charge the battery 220 and, for example, may be a binary "yes" or "no" entry. The target charge amount 426 indicates the user's desired charge level 222 of the battery 220 when the user returns to retrieve the vehicle 200. The target charge amount 426, for example, may be indicated by a percentage. The return time 428 is a time that the user intends to return to retrieve the vehicle 200 from the APS 10. The return time 428 could be a later time on the same day, a later day, or even a longer term.

The user interface 420 transmits the user information 421 and the vehicle data 422 to the parking controller 410 by a wired connection, a wireless connection, near-field communication, or any other type of data connection. In another embodiment, the user interface 420 is omitted, and the user enters the user information 421 and the vehicle data 422 at the mobile device 500, which transmits both to the parking controller 410 though a wired connection, a wireless connection, near-field communication, or any other type of data connection.

The parking controller 410 receives the user information 421 and the vehicle data 422 and, as shown in FIG. 10, stores the user information 421 and the vehicle data 422 in a vehicle entry 440 associated with the vehicle 200 in the stored vehicle database 430. The stored vehicle database 430 contains a plurality of vehicle entries 440, with each of the vehicle entries 440 corresponding to one of the vehicles 200 in the APS 10.

In a step 706 shown in FIG. 11A, the parking controller 410 determines whether the vehicle 200 in the transfer area T is capable of being plugged in to charge a battery 220. The parking controller 410 retrieves the plug-in status 424 of the vehicle 200 from the vehicle data 422 in the vehicle entry 440 stored for the vehicle 200 in the stored vehicle database 430.

If the plug-in status 424 indicates that the vehicle 200 cannot be plugged in during step 706, the charging process 700 proceeds to a step 708. In the step 708 in FIG. 11A, the parking controller 410 communicates with and controls the vehicle relocation system 300 to move the vehicle 200 from the transfer area T to one of the standard storage locations SL, shown in FIGS. 7-9.

After the vehicle 200 has been moved to the standard storage location SL, in a step 710 in FIG. 11A, the parking controller 410 waits for a user retrieval request. In an embodiment, the user inputs the user retrieval request at the user interface 420 corresponding to one of the transfer areas T when the user returns to the APS 10. In another embodiment, the user could enter the user retrieval request on the mobile device 500, which could transmit the user retrieval request to the parking controller 410. In another embodiment, the parking controller 410 could passively receive location data from the mobile device 500 on an interval and could initiate the user retrieval request when the mobile device 500 enters a particular geographic area or geofence around the APS 10.

In step 712, the parking controller 410 determines whether a user retrieval request has been received. If the user retrieval request is not yet received, the parking controller 410 continues to wait in the step 710 and the vehicle 200 remains in the standard storage location SL.

When the parking controller 410 receives the user retrieval request, the parking controller 410 communicates with and controls the vehicle relocation system 300 in a step 714 to move the vehicle 200 from the standard storage location SL to the transfer area T. The user can then retrieve the vehicle 200 from the transfer area T and leave the APS 10.

If the plug-in status 424 indicates that the vehicle 200 can be plugged in during step 706 shown in FIG. 11A, the charging process proceeds to a step 716. In the step 716, the parking controller 410 determines a charge start time 442 for the vehicle 200, shown in FIG. 10. The parking controller 410 retrieves the return time 428 and the target charge amount 426 of the vehicle 200 for each of the vehicle entries 440 in the stored vehicle database 430 that indicate that the vehicle 200 is capable of being plugged in at the plug-in status 424. The parking controller 410 compares the charge start time 442 and the return time 428 for each of the vehicles 200 in the APS 10 that is capable of being plugged in, and determines a charge start time 442 for the newly entered vehicle 200 based on the return time 428 and the target charge amount 426 for each of the vehicles 200 in the APS 10 along with an availability of charging storage locations CL in the APS 10. The charge start time 442 determined by the parking controller 410, a time at which a charging process for the particular vehicle 200 should begin, is stored in the vehicle entry 440 for the vehicle 200 in the stored vehicle database 430.

In a step 717 shown in FIG. 11A, with the vehicle 200 still in the transfer area T, the parking controller 410 retrieves the charge start time 442 of the vehicle 200 from the vehicle entry 440 stored for the vehicle 200 in the stored vehicle database 430. The parking controller 410 compares the charge start time 442 to the current time.

If the charge start time 442 is earlier than or equal to the current time, in a step 718 shown in FIG. 11A, the parking controller 410 communicates with and controls the vehicle relocation system 300 to move the vehicle 200 from the transfer area T to one of the charging storage locations CL, shown in FIGS. 7-9.

If the charge start time 442 is later than the current time, in a step 720 shown in FIG. 11A, the parking controller 410 communicates with and controls the vehicle relocation system 300 to move the vehicle 200 from the transfer area T to one of the standard storage locations SL, shown in FIGS. 7-9.

After the vehicle 200 has been moved to the standard storage location SL, in a step 722 in FIG. 11A, the parking controller 410 retrieves the charge start time 442 of the vehicle 200 from the vehicle entry 440 stored for the vehicle 200 in the stored vehicle database 430, as shown in FIG. 10, and compares the charge start time 442 to the current time on an interval. The interval could be any interval of time measured in milliseconds, seconds, or minutes. In a step 724, if the current time is not yet the charge start time 442, the parking controller 410 continues to compare the times on the interval in the step 722.

If the current time is at or later than the charge start time 442 in the step 724, as shown in FIG. 11A, the parking controller 410 communicates with and controls the vehicle relocation system 300 to move the vehicle 200 from the standard storage location SL to one of the charging storage locations CL, shown in FIG. 7-9.

With the vehicle 200 in the charging storage location CL, whether immediately moved there from the transfer area T or first held in a standard storage location SL, in a step 726 shown in FIG. 11A the parking controller 410 communicates with and controls the charging controller 170 to connect the connector 140 with the adapter port 155 of the adapter 150 positioned in the charging port 210 of the vehicle 200. This process 600 is shown in FIG. 6 and described in detail above with reference to FIGS. 1-5.

Figure 11B:
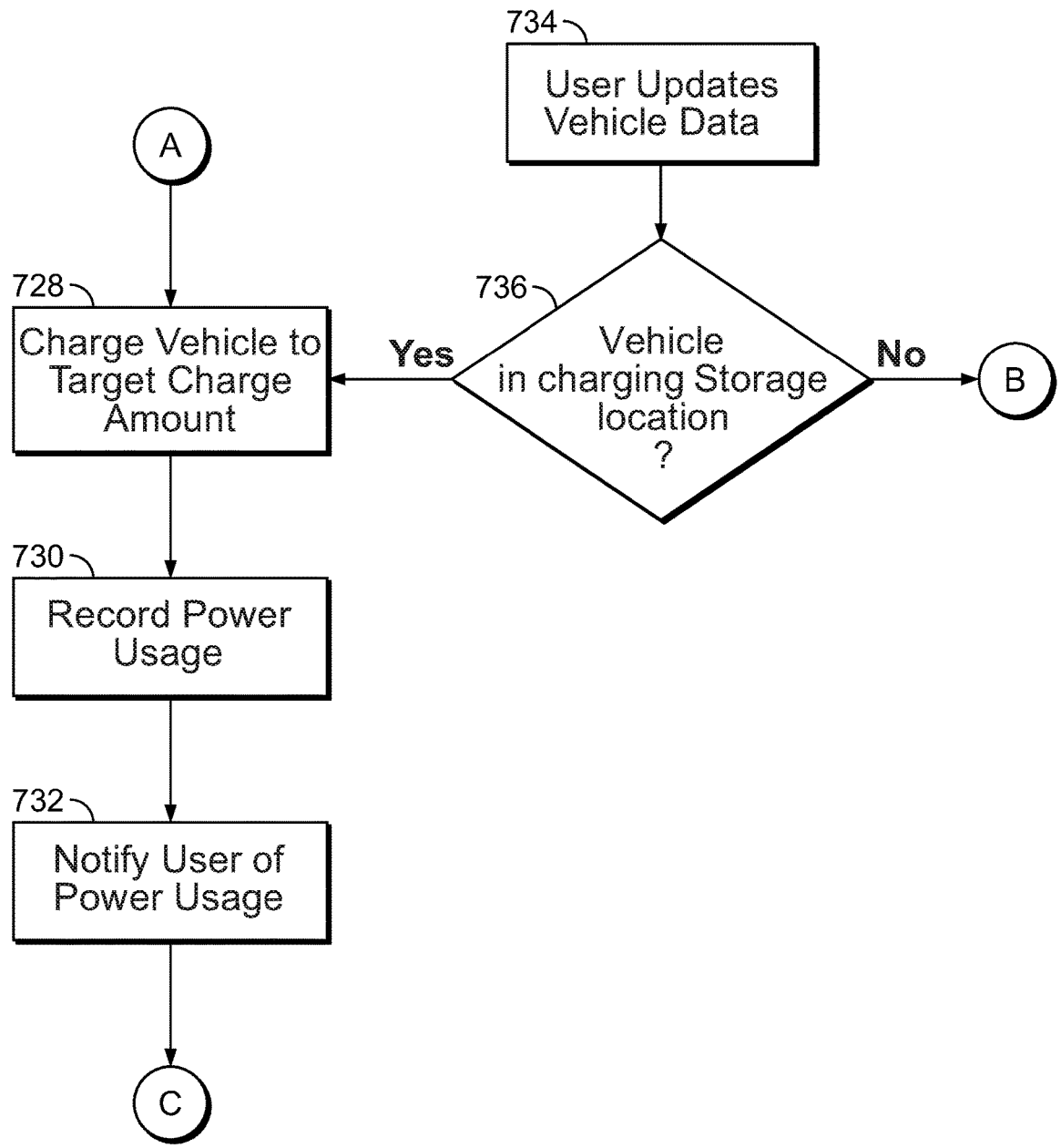
FIG. 11B is a flowchart of a continuation of the charging process in FIG. 11A.

With the connector 140 connected to the adapter 150, as shown in FIG. 4, the parking controller 410 monitors the charge level 222 of the battery 220 of the vehicle 200 in a step 728, shown in FIG. 11B. The parking controller 410 retrieves the target charge amount 426 of the vehicle 200 from the vehicle data 422 in the vehicle entry 440 stored for the vehicle 200 in the stored vehicle database 430. The connector 140 continues to remain electrically connected to the adapter 150, supplying power to the battery 220 through the flexible cable 142 and the connection of the contacts 146, 156, until the parking controller 410 determines that the charge level 222 has reached the target charge amount 426. When the charge level 222 has reached the target charge amount 426, the parking controller 410 communicates with and controls the charging controller 170 to disconnect the connector 140 from the adapter port 155, moving the flexible cable 142 back to the retracted position R shown in FIG. 2.

In a step 730 shown in FIG. 11B, the parking controller 410 records a power usage 444 in charging the vehicle 200 with the charging system 100 in the vehicle entry 440, as shown in FIG. 10. In a step 732 shown in FIG. 11B, the parking controller 410 can optionally notify the user of the power usage 444 by retrieving the power usage 444 from the vehicle entry 440 and communicating the power usage 444 to the mobile device 500 of the user associated with the user information 421 in the vehicle entry 440. The power usage 444 can be communicated to the mobile device 500 wirelessly through an email, a text message, an application on the mobile device 500 associated with the APS 10, or any other form of wireless communication. The power usage 444, as shown in FIG. 10, is also stored in the stored vehicle database 430 in association with the user information 421 for retrieval by an administrator of the APS 10, for example, for later invoicing or usage tracking.

With the vehicle 200 charged to the target charge amount 426 in steps 726-732, the process 700 proceeds to the step 708 shown in FIG. 11A. The parking controller 410 communicates with and controls the vehicle relocation system 300 to move the vehicle 200 to the standard storage location SL, then follows the remaining steps 710-714 to return the vehicle 200 to the transfer area T for the user.

As shown in FIG. 11B, the user can also update the vehicle data 422 remotely while the vehicle 200 is stored in the APS 10 in a step 734. The user enters updated vehicle data 422 on the mobile device 500, which wirelessly communicates with the parking controller 410. The user can update the target charge amount 426 and/or the return time 428. The parking controller 410 stores the updated vehicle data 422 in the vehicle entry 440 particular to the user and the user's vehicle 200.

With the vehicle data 422 updated, in a step 736 shown in FIG. 11B, the parking controller 410 determines whether the vehicle 200 associated with the updated vehicle data 422 received from the user is currently in a charging storage location CL. If the vehicle 200 is not in a charging storage location CL, the parking controller 410 proceeds with the determination in step 716 with updated information, then proceeding through steps 717-732 as described above. If the vehicle 200 is in a charging storage location CL, the parking controller 410 proceeds with the charging 728 with the updated information, then proceeding through steps 730 and 732 as described above.

What is claimed is:

1. A charging system for a vehicle, comprising:
   a connector suspended on a flexible cable and movable along a plurality of axes perpendicular to one another; and
   an adapter having a plug at a first end and an adapter port at a second end opposite the first end, the plug is removably disposed in a charging port of the vehicle and the adapter port extends outward from the vehicle, the adapter port is positioned within a height of the vehicle extending along a vertical axis from a ground surface on which the vehicle is disposed to a roof of the vehicle, the connector is movable into a mated position with the adapter port.

2. The charging system of claim 1, further comprising an overhead moving system connected to the flexible cable and the connector, the overhead moving system moves the connector along a first horizontal axis, a second horizontal axis perpendicular to the first horizontal axis, and the vertical axis perpendicular to the first horizontal axis and the second horizontal axis.

3. The charging system of claim 2, wherein the overhead moving system includes a bridge movable along the first horizontal axis.

4. The charging system of claim 3, wherein the overhead moving system includes a trolley held by the bridge and movable along the bridge along the second horizontal axis.

5. The charging system of claim 4, wherein the flexible cable is attached to the trolley, the connector is movable with respect to the trolley along the vertical axis.

6. The charging system of claim 5, wherein the overhead moving system includes a cable reel attached to the trolley, the flexible cable is wound around the cable reel.

7. The charging system of claim 6, wherein the cable reel is rotatable to move the connector between a retracted position distal from the vehicle and an extended position proximal to the vehicle along the vertical axis.

8. The charging system of claim 3, wherein the overhead moving system includes a pair of support rails having a fixed position, the bridge is movable along the support rails.

9. The charging system of claim 2, wherein the connector has a first alignment element and the adapter has a second alignment element, the first alignment element and the second alignment element position the connector in a mating alignment position with respect to the adapter port when in a proximity of the adapter port.

10. The charging system of claim 2, wherein the connector has a first contact and the adapter port has a second contact, the first contact is electrically connected with the second contact in the mated position.

11. The charging system of claim 2, further comprising a charging controller and a vision system disposed on the trolley, the vision system is connected to the charging controller and supplies a vision data to the charging controller.

12. The charging system of claim 11, wherein the charging controller controls the overhead moving system to position the connector in the mated position with the adapter port based on the vision data from the vision system.

13. The charging system of claim 4, wherein the bridge has a pair of bridge rails extending parallel to one another along the second horizontal axis and spaced apart from one another in a direction of the first horizontal axis.

14. The charging system of claim 13, wherein the trolley has a trolley housing disposed between the bridge rails and a trolley drive drivable to move the trolley housing along the second horizontal axis along the bridge rails.

15. An automated parking system, comprising:
a transfer area in which a user leaves a vehicle;
a plurality of different charging storage locations having a single charging system, the charging system including a connector suspended on a flexible cable and movable along a plurality of axes perpendicular to one another and an adapter having a plug at a first end and an adapter port at a second end opposite the first end, the plug is removably disposed in a charging port of the vehicle and the adapter port extends outward from the vehicle, the connector is movable into a mated position with the adapter port, the charging system moves the connector to mate with the adapter of any of a plurality of different vehicles while the different vehicles are positioned in the plurality of different charging storage locations sharing the single charging system;
a standard storage location that does not have the charging system; and
a vehicle relocation system automatically moving the vehicle between the transfer area, the standard storage location, and the charging storage locations, the vehicle relocation system is capable of leaving the vehicle in each of the standard storage location and the charging storage locations, the standard storage location and the charging storage locations are similarly sized in at least two dimensions.

16. The automated parking system of claim 15, wherein the connector can move only within the charging storage locations, the adapter is separate from the connector and can move beyond the charging storage locations.

17. The automated parking system of claim 15, wherein the connector is matable with the adapter of the plurality of different vehicles having a plurality of different types of charging ports.

18. The automated parking system of claim 15, wherein the standard storage location and at least one of the charging storage locations are aligned along a vertical axis.

19. A method of automatically charging a vehicle in an automated parking system, comprising:
providing a charging storage location and a standard storage location in which the vehicle can be parked;
providing a charging system including a connector suspended on a flexible cable and an adapter having a plug at a first end and an adapter port at a second end opposite the first end, the charging system is in the charging storage location and is not in the standard storage location;
inserting the plug into a charging port of the vehicle;
moving the connector along a plurality of axes perpendicular to one another into a mated position with the adapter port; and
moving the vehicle automatically between the charging storage location and the standard storage location with a vehicle relocation system based on a vehicle data of the vehicle, the vehicle relocation system is capable of leaving the vehicle in each of the standard storage location and the charging storage location, the standard storage location and the charging storage locations are similarly sized in at least two dimensions.

20. The method of claim 19, further comprising entering a transfer area of the automated parking system, the inserting step is performed in the transfer area after the entering step.

21. The method of claim 20, wherein the transfer area has a user interface, a user enters at least a portion of the vehicle data on the user interface.

22. The method of claim 19, wherein a user enters the vehicle data remotely from the automated parking system.

23. The method of claim 19, wherein the vehicle data includes at least one of a plug-in status, a target charge amount, and a return time.

24. The method of claim 23, further comprising determining a charge start time for the vehicle at which the vehicle is moved to the charging storage location.

25. The method of claim 24, wherein the charge start time is determined based on the target charge amount and the return time for a plurality of vehicles in the automated parking system.

26. The method of claim 19, further comprising updating the vehicle data from a mobile device of a user of the vehicle.

27. The method of claim 19, wherein the charging system includes an overhead moving system connected to the flexible cable and the connector, a charging controller connected to the overhead moving system, and a vision system connected to the charging controller and supplying a vision input to the charging controller.

28. The method of claim 27, wherein, in the moving step, the charging controller controls the overhead moving system to position the connector in a proximity of the adapter based on the vision input from the vision system.

29. The method of claim 19, further comprising recording a power usage in charging the vehicle with the charging system and notifying a user of the vehicle of the power usage.

\* \* \* \* \*